United States Patent
Kruckeberg et al.

(10) Patent No.: US 12,222,033 B2
(45) Date of Patent: Feb. 11, 2025

(54) HYDROSTATIC TRANSMISSION CONTROL SYSTEM

(71) Applicant: Deere & Company, Moline, IL (US)

(72) Inventors: John P. Kruckeberg, Clarks Hill, SC (US); Mark A. Herman, LaPorte City, IA (US); David L. Sprinkle, Warrenton, GA (US); Harry K. Voelp, IV, Evans, GA (US); Tejal Sarda, Pune (IN); Julie B. Kuyath, Grovetown, GA (US); Steven P. Forssberg, Waterloo, IA (US); Chad E. Schoneman, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 163 days.

(21) Appl. No.: 18/049,118

(22) Filed: Oct. 24, 2022

(65) Prior Publication Data

US 2024/0133464 A1 Apr. 25, 2024
US 2024/0229928 A9 Jul. 11, 2024

(51) Int. Cl.
*F16H 61/08* (2006.01)
*F16H 61/02* (2006.01)
*F16H 61/04* (2006.01)

(52) U.S. Cl.
CPC ......... *F16H 61/08* (2013.01); *F16H 61/0403* (2013.01); *F16H 2061/0244* (2013.01); *F16H 2306/48* (2013.01)

(58) Field of Classification Search
CPC .............. F16H 61/08; F16H 61/0403; F16H 2061/0244; F16H 2306/48

USPC ........................................................ 74/335
See application file for complete search history.

(56) References Cited

U.S. PATENT DOCUMENTS

| 4,208,929 | A | | 6/1980 | Heino et al. | |
| 4,246,806 | A | | 1/1981 | Reynolds et al. | |
| 5,335,750 | A | * | 8/1994 | Geringer | B60K 17/10 |
| | | | | | 60/433 |
| 6,202,016 | B1 | * | 3/2001 | Stephenson | F16H 61/478 |
| | | | | | 701/64 |
| 6,655,233 | B2 | | 12/2003 | Evans et al. | |

(Continued)

FOREIGN PATENT DOCUMENTS

| CN | 115031018 A | 9/2022 |
| EP | 0270196 A2 | 6/1988 |

OTHER PUBLICATIONS

Great Britain Combined Search and Examination Report issued in application No. GB2313283.0 dated Feb. 29, 2024, 06 pages.

*Primary Examiner* — Ha Dinh Ho

(57) ABSTRACT

A hydrostatic transmission control system includes a controller that monitors inputs for shifting a transmission of a tractor to a different range gear; determines if an engine on the tractor is operating in a desired and acceptable shift range based on a sensed speed and a load of the engine, and determines if a hydrostatic transmission on the tractor is operating in a desired and acceptable shift range based on a sensed load and a speed of the hydrostatic transmission. If the controller determines the engine and the hydrostatic transmission are operating in the desired and acceptable shift range, the controller commands an oncoming clutch to ramp up and an off going clutch to ramp down, and synchronizes speeds of the engine and the hydrostatic transmission.

10 Claims, 2 Drawing Sheets

(56) References Cited

U.S. PATENT DOCUMENTS

| | | | |
|---|---|---|---|
| 6,675,577 B2* | 1/2004 | Evans | F16H 61/465 |
| | | | 60/449 |
| 7,296,496 B2 | 11/2007 | Shah | |
| 7,310,943 B2 | 12/2007 | Burgart et al. | |
| 7,316,115 B1 | 1/2008 | Jansen et al. | |
| 7,373,776 B2 | 5/2008 | Burgart et al. | |
| 7,613,560 B2* | 11/2009 | Nishi | F16H 61/462 |
| | | | 701/50 |
| 7,630,793 B2* | 12/2009 | Thomas | E02F 9/26 |
| | | | 701/50 |
| 8,186,473 B2 | 5/2012 | Brome et al. | |
| 8,414,454 B2* | 4/2013 | Nishi | F16H 61/462 |
| | | | 74/731.1 |
| 9,599,107 B2 | 3/2017 | Wu et al. | |
| 2003/0010026 A1 | 1/2003 | Evans et al. | |
| 2009/0133951 A1* | 5/2009 | Schultz | F16H 61/431 |
| | | | 477/38 |
| 2011/0172888 A1* | 7/2011 | Dschida | F16H 61/0403 |
| | | | 74/473.1 |
| 2014/0283507 A1* | 9/2014 | Kisselbach | B66C 13/20 |
| | | | 60/484 |

\* cited by examiner

HYDROSTATIC TRANSMISSION CONTROL SYSTEM

FIELD OF THE INVENTION

This invention relates to off road vehicles such as compact tractors, and specifically to hydrostatic transmission control systems for such vehicles.

BACKGROUND OF THE INVENTION

Hydrostatic transmissions (HSTs) are commonly used in off road vehicles such as compact tractors. HSTs typically include a hydraulic pump and motor in a closed hydraulic system to produce a continuously variable gear ratio between the input pump shaft and output motor shaft through either variable pump or motor displacement. Due to availability of configuration options, component sizing, and packaging constraints, HSTs are often further paired with a gear transmission consisting of an in-line mechanical gearset to match desired vehicle operating speeds and load with the power generator's (i.e., internal combustion engine's) most effective operating range. While the coupling of an HST and gear transmission is an effective drivetrain arrangement which meets cost and packaging objectives, this platform commonly found on compact tractors has room for further improvement.

On compact tractors with HST and mechanical drivetrain systems, the tractor must come to a stop before the operator may adjust the gear ratio in order to assure synchronization of the driving shaft speed and driven shaft speed between the driveline ranges. For applications where load and speed requirements often change during operation, multiple manual shift events can reduce productivity. Examples of such applications include snow removal, loader work, and transport cases.

To improve compact tractor productivity, broaden capability, and improve ease of use, an HST control system is needed having synchronizing logic to allow for power shifting without stopping the vehicle. An HST control system is needed that has comparable performance to higher cost and complex infinitely variable transmissions. A system is needed to control an HST in unison with a geartrain containing electrohydraulic clutch packs on a compact tractor.

In the past, HST drivetrain control has focused on clutch controls and HST controls independently. There is a need for a HST control system that integrates and synchronizes commands during shift events to optimize user experience and machine performance.

SUMMARY OF THE INVENTION

A hydrostatic transmission control system includes a clutch controller that receives shift commands for a gear transmission on the tractor while it is travelling in forward or reverse, or is stationary, and initiates a gear shift if the shift command satisfies an algorithm based on inputs from the hydrostatic transmission swashplate controller and the gear transmission. The algorithm includes at least one performance criteria related to efficiency, durability and productivity. The hydrostatic transmission swashplate controller may receive inputs from the operator and the clutch controller for swashplate position, and sensed inputs from an engine and a hydrostatic transmission.

DESCRIPTION OF THE PREFERRED EMBODIMENT

Figure 1:
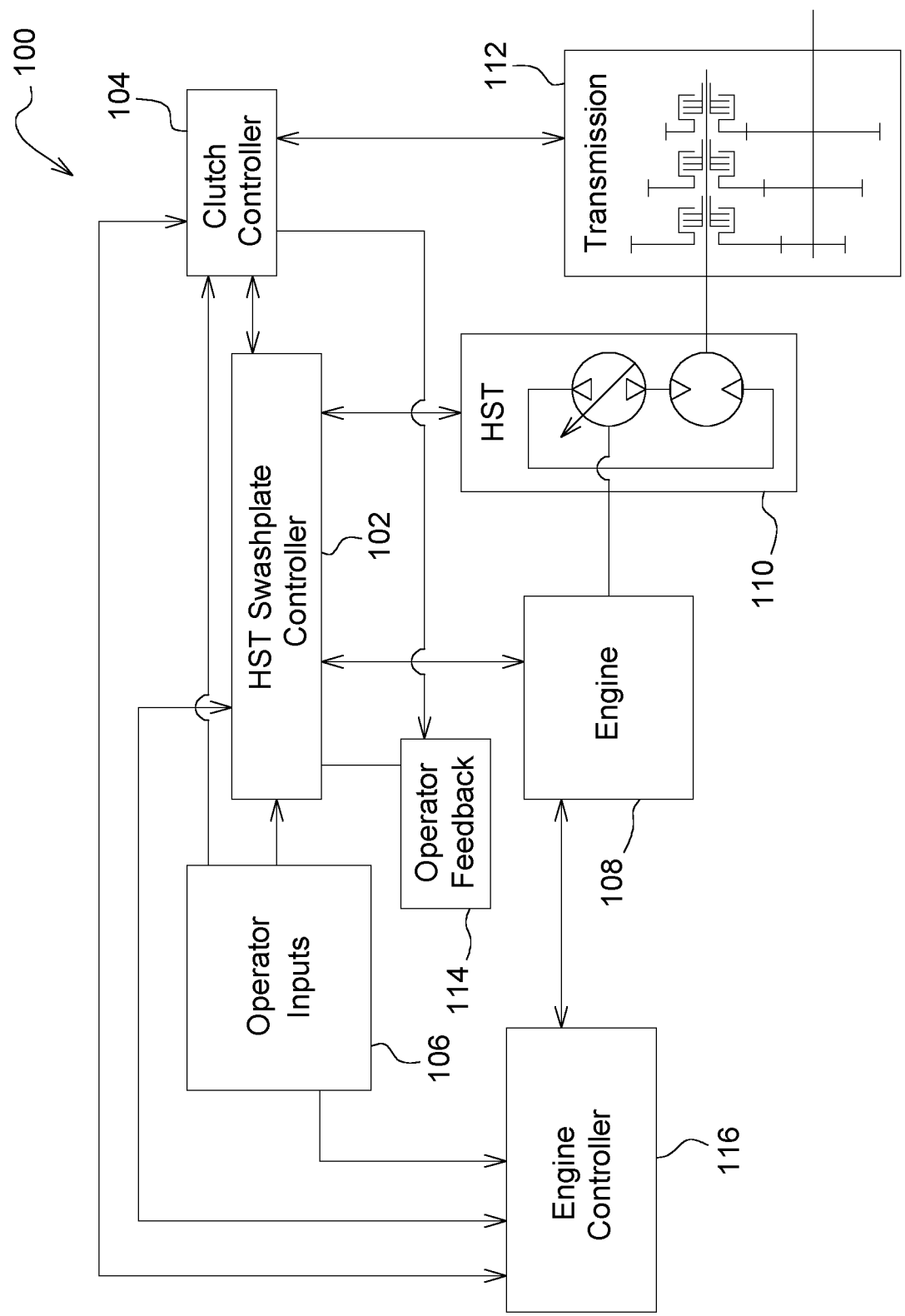
FIG. 1 is a schematic diagram of the components of an HST control system according to a first embodiment of the invention.

In one embodiment shown in FIG. 1, HST control system 100 may include hydrostatic transmission (HST) swashplate controller 102 and clutch controller 104. Alternatively, the two controllers may be integrated together as a control unit. In the manual mode, the HST swashplate controller may receive commands from operator input 106 which may be a proportional control input relating to swashplate position. The clutch controller also may receive shift commands from operator input 106 which may be a hand or foot control, or device such as a shift lever or touch screen. The maximum and minimum input of the control may result in the maximum or minimum speed output for the selected power flow of the transmission. The HST swashplate controller also may receive sensed inputs from engine 108 and HST 110, and the clutch controller may receive sensed inputs from transmission 112. The sensed inputs may include HST circuit pressure (hydraulic pressure downstream of the HST pump, and downstream of the HST motor), swashplate position, clutch pressures, clutch input shaft speed, clutch output shaft speed, and engine speed.

In one embodiment, when HST control system 100 detects the initiation of a shift command either while the tractor is in motion (i.e. traveling in the forward or reverse directions) or stationary, the controllers may determine if engine 110 and transmission 112 are operating within speed and load ranges which are conducive and optimal for a shift event to occur. The HST control system may analyze specific performance variables during the shift evaluation, including: (1) Efficiency, i.e., Does the shift maintain or increase engine and/or transmission operating efficiency; (2) Durability and Reliability, i.e., Does the shift produce an outcome that increases component durability and reliability; (3) Productivity, i.e., Does the shift change position the system such that vehicle productivity is increased. Clutch controller 104 may use an algorithm to evaluate these three performance criteria in allowing for a shift to occur. If the algorithm determines a shift is acceptable or necessary, the clutch controller may function as a master controller to command swashplate controller 102 to modify the swashplate position to provide speed matching. For example, the algorithm may have durability and productivity criteria allowing an upshift if the current swashplate position is greater than 50%, or allowing a downshift if it is less than 50%.

In one embodiment, if the HST control system determines a shift is acceptable, the controllers may initiate the shift while the tractor is in motion or stationary. Specifically, the clutch controller may begin to modify the off-going gear clutch pressure in a decreasing fashion while also increasing the on-coming gear clutch pressure. The clutch controller also may monitor the clutch slippage, input shaft speed, and output shaft speed, along with clutch pressures, during the shifting operation. The HST swashplate controller may modify the transmission command in order to synchronize the input shaft speed for the on-coming gear with the output shaft speed. The HST controller also may work in tandem with the engine controller 116 to modify engine speed which in turn also modifies the corresponding input shaft speed. Both open loop timing operations as well as event triggering logic may be included within the HST and shift controller logic during the shift event. The system may use shift control logic to control an offgoing clutch simultaneously while bringing on an oncoming clutch.

In one embodiment, the HST control system also may operate in an automatic control mode. If the operator selects the automatic control mode, the operator may provide a proportional control input to the HST by a hand or foot control. The HST control system, however, may initiate each shift command based on the operation state. For example, the HST control system may initiate shift commands based on monitoring one or more shift initiation evaluation conditions. The HST control system may select the optimal range gear based on the engine load and desired ground speed. The clutch controller may monitor a shift range as the load or speed command varies.

In one embodiment, the HST control system also may operate in an operation control mode to meet specific application needs. For example, this mode may include a maximum desired travel speed, a shift aggressiveness setting, a setting to control engine speed during each shift, or a setting to maintain constant engine speed during each shift. The clutch controller may select a range gear speed ratio and adjust the HST output to achieve the application needs such as the desired travel speed to maintain at least the minimum engine rpm. After the operator sets the maximum desired ground speed and minimum engine speed, he or she also may use the hand or foot pedal to provide at least 80% of the full normal input control to the HST. The transmission controller then may select a range gear and adjust the HST output to achieve the desired ground speed at or above the minimum engine speed. If the transmission controller selects a range gear but the HST cannot reach the desired ground speed and minimum engine speed, the transmission controller may select another range gear ratio. When shifting between range gears, the transmission controller may vary the HST output speed to achieve near synchronous speed between range gears during the shift. Once the shift is completed, the transmission controller may resume adjusting the HST control to achieve the desired ground speed and at least the minimum engine speed. For example, the transmission controller may reduce the actual ground speed if needed to meet the minimum engine speed.

Figure 2:
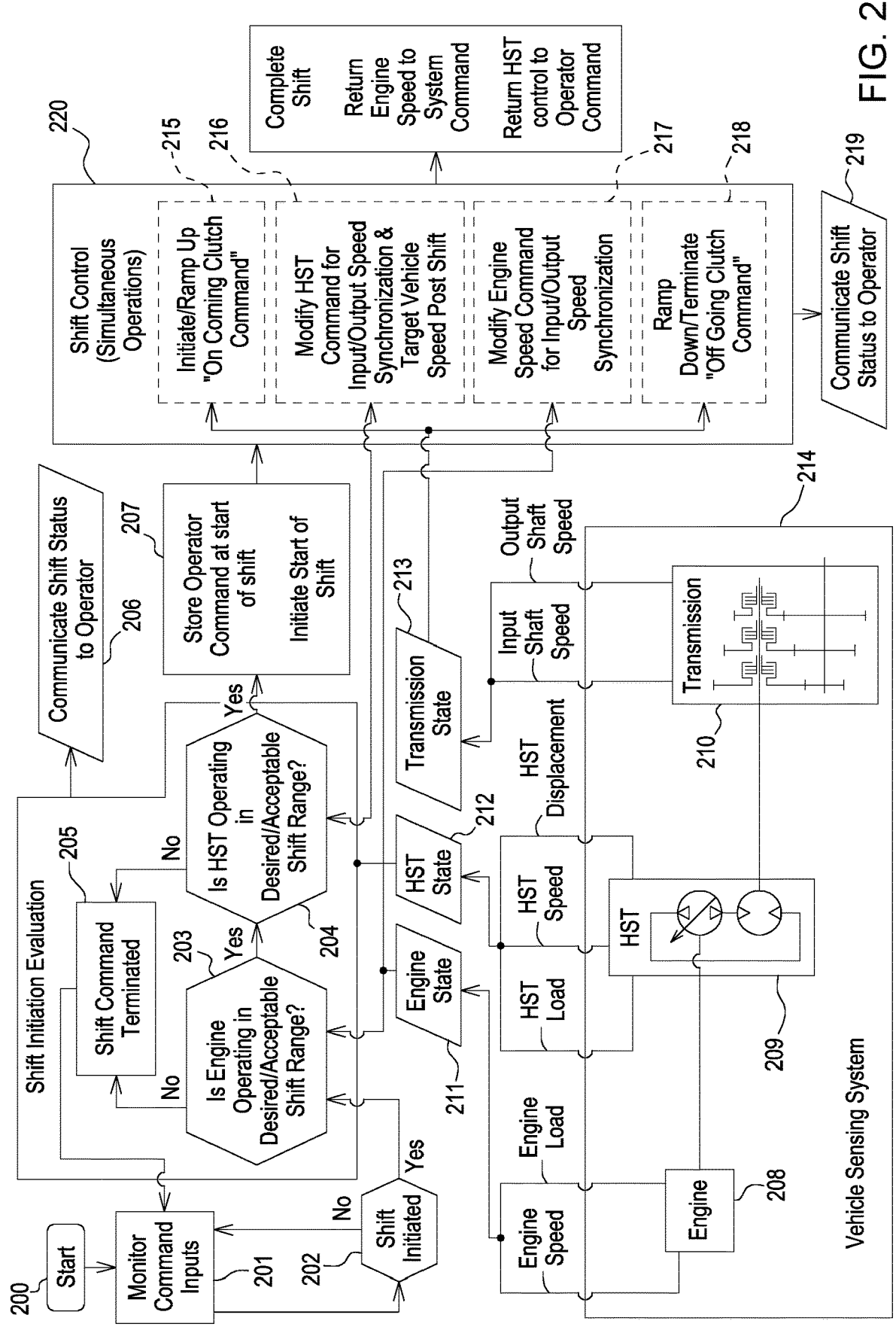
FIG. 2 is a logic diagram showing the steps followed by an HST control system according to a first embodiment of the invention.

In one embodiment, the HST control system may include shift control logic following the steps shown in FIG. 2. The shift control logic may start in step 200, and the controllers may monitor command inputs in step 201. Command inputs in the manual mode may be manual input shift commands. Command inputs in the automatic mode may be based on sensed parameters such as engine speed, ground speed, engine load, transmission input or output shaft speed, transmission load, and current gear. If a shift is initiated in step 202, the HST swashplate controller may determine if the engine is operating in a desired or acceptable shift range in step 203. To determine if the engine is in this range, the HST swashplate controller may receive engine state inputs including engine speed and engine load in step 211. Vehicle sensing system 214 may be used for engine state inputs from engine 208. The HST swashplate controller also may determine if the HST is operating in a desired or acceptable shift range in step 204. To determine if the HST is in this range, the HST swashplate controller may receive HST state inputs including HST speed, HST load and HST displacement in step 212. Vehicle sensing system 214 also may be used for HST state inputs from HST 209. If the engine or HST are not operating in a desired or acceptable shift range, the HST swashplate controller may terminate the shift command in step 205, and the system may return to monitor command inputs in step 201. The system may communicate shift status to the operator in step 206, while determining if the engine and HST are operating in a desired or acceptable shift range.

Still referring to FIG. 2, in step 207, if the HST swashplate controller determines the engine and HST are operating in a desired or acceptable shift range, the HST swashplate controller may store the operator command at the start of the shift, and initiate the start of shift. In step 220, the clutch controller may execute certain shift control operations simultaneously as shown in steps 215-218. During steps 215-218, the clutch controller may receive transmission state inputs including input shaft speed and output shaft speed in step 213. Vehicle sensing system 214 may be used for transmission state inputs from range transmission 210. In step 215, the clutch controller may initiate and ramp up the clutch command for the oncoming or target gear. In step 216, the clutch controller may modify the HST command for input/output speed synchronization, and target vehicle speed after the shift. In step 217, the clutch controller may modify the engine speed command for input/output speed synchronization. In step 218, the clutch controller may ramp down and terminate the clutch command for the off-going or current gear. The system may communicate shift status to the operator in step 219. In step 221, after executing the shift control operations, the clutch controller may complete the shift, return engine speed to the system command, and control to the operator command.

In one embodiment, the HST control system may provide feedback to the operator concerning status of the shift and vehicle state. For example, the feedback may be provided on a display screen of the vehicle, and may include: a machine state which is conducive to shift up or down; a machine state which is not conducive to a shift up or down; acceptance or rejection of a shift command; status when a shift is in progress; current gear; and target gear. Current gear may be the actively engaged gear, and target gear may be the gear commanded by the operator or system, which may become engaged subsequently depending upon machine state.

The HST control system may control hydrostatic transmission (HST) and mechanical drivetrain system electro-hydraulically through the use of solenoids which relate a command source with a hydraulic pressure which actuates a swashplate. The HST ratio may be controlled by a variable displacement pump, variable displacement motor, or both. In one embodiment, the HST control system may provide electronic signals to control HST and clutches. Alternatively, the HST control system may use other actuator means, such as a combination of hydro-mechanical, fully electric or mechanical devices, to control the HST and clutches. The transmission clutch packs are most commonly mechanically controlled through lever actuation, or may also be controlled electro-hydraulically.

Having described the preferred embodiment, it will become apparent that various modifications can be made without departing from the scope of the invention as defined in the accompanying claims.

What is claimed is:
1. A hydrostatic transmission control system comprising:
 a clutch controller that receives a shift command for a gear transmission on a tractor while the tractor is travelling forward or is stationary and initiates a gear shift if the shift command satisfies an algorithm based on inputs from a hydrostatic transmission swashplate controller and the gear transmission, the algorithm including at least one performance criteria related to efficiency, durability and productivity; the hydrostatic transmission swashplate controller receiving inputs from an operator and the clutch controller for swashplate position and sensed inputs from an engine and a hydrostatic transmission.

2. The hydrostatic transmission control system of claim 1, further comprising an engine controller that modifies engine speed if the clutch controller initiates a gear shift.

3. The hydrostatic transmission control system of claim 1, wherein the shift command is provided by a manual shift lever.

4. The hydrostatic transmission control system of claim 1, wherein the shift command is automatically provided based on a plurality of sensed parameters.

5. A hydrostatic transmission control system comprising steps of:
   monitoring inputs for shifting a transmission of a tractor to a different range gear while traveling in forward, reverse or stationary;
   determining if an engine on the tractor is operating in a desired and acceptable shift range based on a sensed speed and a load of the engine;
   determining if a hydrostatic transmission on the tractor is operating in a desired and acceptable shift range based on a sensed load and a speed of the hydrostatic transmission;
   if the engine and the hydrostatic transmission are operating in their respective desired and acceptable shift range, commanding an oncoming clutch to ramp up and an off going clutch to ramp down, and synchronizing speeds of the engine and the hydrostatic transmission.

6. The hydrostatic transmission control system of claim 5, wherein the inputs include a manual mode in which the range gear shift is an operator command, and an automatic mode in which the range gear shift is a system command based on at least one sensed parameter of the tractor.

7. The hydrostatic transmission control system of claim 5, further including a step of selecting an optimal range gear based on the engine load and a desired ground speed.

8. A hydrostatic transmission control system comprising:
   a controller that evaluates shift commands to change gears in a range gear transmission based on a plurality of sensed inputs from an engine and a hydrostatic transmission; provides clutch commands for outgoing and oncoming gears; and synchronizes engine and vehicle speed.

9. A hydrostatic transmission control system of claim 8, wherein the controller monitors the initiation of the shift commands for shifting the range gear transmission.

10. The hydrostatic transmission control system of claim 8, wherein the system provides feedback to the operator concerning status of the shift of range gears on a display screen, including if the system is conducive or not conducive to a shift of range gears, acceptance or rejection of one of the shift commands, and a status when a shift of range gears is in progress.

* * * * *